(12) United States Patent
Kunimatsu et al.

(10) Patent No.: US 6,232,961 B1
(45) Date of Patent: May 15, 2001

(54) DISPLAY APPARATUS

(75) Inventors: Yoshimasa Kunimatsu; Minoru Morikawa; Satoshi Mori; Chikao Nagasaka; Masato Nishikawa, all of Niwa-gun (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 0 days.

(21) Appl. No.: 09/102,905

(22) Filed: Jun. 23, 1998

(30) Foreign Application Priority Data

Jun. 26, 1997 (JP) .................................................... 9-170087

(51) Int. Cl.$^7$ ...................................................... G09G 5/00
(52) U.S. Cl. ......................... 345/173; 345/175; 178/18.09
(58) Field of Search ..................................... 345/173, 174, 345/175; 178/18.01, 18.03, 18.06, 18.07, 18.09; 340/990, 995

(56) References Cited

U.S. PATENT DOCUMENTS

| | | | |
|---|---|---|---|
| 4,812,833 | * 3/1989 | Shimauchi | 345/175 |
| 4,868,912 | * 9/1989 | Doering | 345/175 |
| 5,539,429 | * 7/1996 | Yano et al. | 345/173 |
| 5,784,036 | * 7/1998 | Higuchi | 345/7 |
| 5,956,019 | * 9/1999 | Bang et al. | 345/173 |
| 5,995,083 | * 11/1999 | Sato et al. | 345/173 |

* cited by examiner

Primary Examiner—Richard Hjerpe
Assistant Examiner—Alexander Eisen
(74) Attorney, Agent, or Firm—Oliff & Berridge, PLC

(57) ABSTRACT

A display device is disposed in a car and a display screen is switched based upon coordinate data showing the touched position which is output from a touch tracer which is disposed where it can be accessed by a driver, and "on" data that shows that the touch tracer has been press-operated. The display device displays small button display portions to select a next display operation which is to be displayed on the map screen. The button display portions which are shown on the map screen in an input state of the coordinate data from the touch tracer are displayed in an expanded state. By so doing, the driver can easily confirm the display content of the button display portions so that it is possible to improve the operability of the touch tracer for the selection of the button display portions.

18 Claims, 16 Drawing Sheets

DISPLAY APPARATUS

INCORPORATION BY REFERENCE

The disclosure of Japanese Application No. Hei 9-170087 filed on Jun. 26, 1997 including the specification, drawings and abstract is incorporated herein by reference in its entirety.

BACKGROUND OF THE INVENTION

1. Field of Invention

The present invention relates to a display apparatus which performs a display operation corresponding to display content of a button display portion when "on" data, showing that an operating surface is press-operated, is inputted. Coordinate data showing a touched position on the operating surface corresponds to a coordinate of the button display portion that is displayed on the display screen.

2. Description of Related Art

Vehicles, for example, are provided with a conventional display device with a touch operation function. One example of this display device is constructed to detect a touched position with respect to a display screen through an optical sensor. Specifically, light projecting elements and light receiving elements are arranged so as to form a plurality of parallel optical axes corresponding to vertical and horizontal directions of the display screen. By touching the display screen with a finger, some optical axes extending between the light projecting elements and the light receiving elements are blocked, a center position of the touched area is detected and the coordinate data is outputted.

Accordingly, when an air conditioner screen, for example, is displayed, it is possible to arbitrarily adjust the air conditioning function in the vehicle by touch-operating a button display portion which is displayed on the screen for the air conditioner. By using the display device with this type of touch operation function, it is possible to omit switches for devices on the vehicle, such as the air conditioner, a radio, or a car navigation system. Therefore, the instrument panel can look neat.

In the conventional display device with the touch operation function as described above, the driver is required to touch the display device by stretching his arm, thus rendering controllability of the display device insufficient. Therefore, separating the touch operation function from the display device has been considered. A touch operation information output device, that outputs coordinate data showing the finger-touched position on the operating surface and also outputs "on" data indicating that operating surface is press-operated, is disposed separately from the display device. The touch operation information output device is installed, for example, on the arm rest of the driver's side door so that it is possible to improve operability by the driver. However, because, for example, the button display portion of the map screen is displayed quite small without standing out, the button display portion is difficult to recognize even though operation is improved. Problems remain such that a user can select an erroneous button display portion by a touch operation of the touch operation information output device.

Furthermore, in order to select a button display portion which is displayed on the display screen, the user has to press-operate the operating surface in a state where the user touches the operating surface of the touch operation information output device. It is easy to perform an erroneous operation of the touch operation information output device and, because of this, the display device has a disadvantage of performing the displayed operation corresponding to the button display portion which was selected by mistake.

SUMMARY OF THE INVENTION

The present invention reflects upon the above-mentioned situation and the objectives are to improve the selection operation of the button display portion for a user with a structure in which the display screen is switched in response to the selected button display portion, and to provide a display device which prevents the user from selecting the button display portion by mistake regardless of erroneous operation by the user.

The present invention is arranged so as to input coordinate data showing the touched position on an operating surface disposed at a specified position, and "on" data showing that the operating surface has been press-operated. When the "on" data is input in a state in which the input coordinate data corresponds to a button display portion which is displayed on the display screen, a display device equipped with display means performs a display operation corresponding to the button display portion and the display means displays the button display portion in an enlarged state on the display screen when the coordinate data is input.

According to the invention, when the user performs the touch operation on the operating surface, the coordinate data showing the touched position for the operating surface is inputted. Then, the display means determines that the user performed the touch operation on the operating surface when the coordinate data is input, and the button display portions which are displayed on the display screen are displayed in an enlarged state. By so doing, the user can easily confirm the button display portion so that it is possible to accurately select a desired button display portion by the touch operation of the operating surface.

In the invention using the display means in a state where a button display portion is displayed in an enlarged state, it is acceptable to change the display configuration of the button display portion when the input coordinate data corresponds to the button display portion.

According to the invention, when touching the operating surface corresponding to the button display portion, the display means changes the display configuration of the button display portion so that the user can confirm the button display portion selected. Furthermore, the display means can invalidate the input coordinate data and the "on" data when the "on" data is input simultaneously with the start of the input of the coordinate data.

According to the invention, when the user suddenly press-operates the operating surface, and it is determined as an erroneous operation, the display means invalidates the input coordinate data and the "on" data when the "on" data is input simultaneously with the start of the input of the coordinate data. By so doing, it is possible to prevent execution of the erroneous display operation by the simultaneous pressing of the operating surface. Furthermore, the display means can invalidate the input coordinate data and the "on" data when the button display portion corresponding to the input coordinate data changes in an input state of the "on" data.

According to the invention, when the user press-operates the operating surface and the button display portion corresponding to the input coordinate data changes through a change of the touched position of the operating surface, it can be determined as an erroneous operation. Therefore, the display means can invalidate the input coordinate data and the "on" data when the button display portion corresponding to the input coordinate data changes in an input state of the "on" data. By so doing, it is possible to prevent the execution of the display operation by mistake due to moving the touched position in a press-operating state of the operating surface.

Furthermore, the display means can validate the button display portion that was invalidated prior to the change when the button display portion corresponding to the coordinate data changes at the input timing of the "on" data.

According to the invention, when the touched position for the operating surface moves at the timing at which the user press-operates the operating surface, it is determined as an erroneous operation so that the display means validates the button display portion that was indicated prior to the change when the button display portion corresponding to the coordinate data changes at the timing when the "on" data is input. By so doing, it is possible to prevent the execution of the display operation by mistake due to moving the touched position during the press-operation of the operating surface.

BRIEF DESCRIPTION OF THE DRAWINGS

The invention will be appreciated and understood from consideration of the detailed description of the invention when taken together with the accompanying drawings, in which.

DETAILED DESCRIPTION OF PREFERRED EMBODIMENTS

In the following, one embodiment in which the present invention is applied to a display device for a car is explained by referring to drawings.

Figure 1:
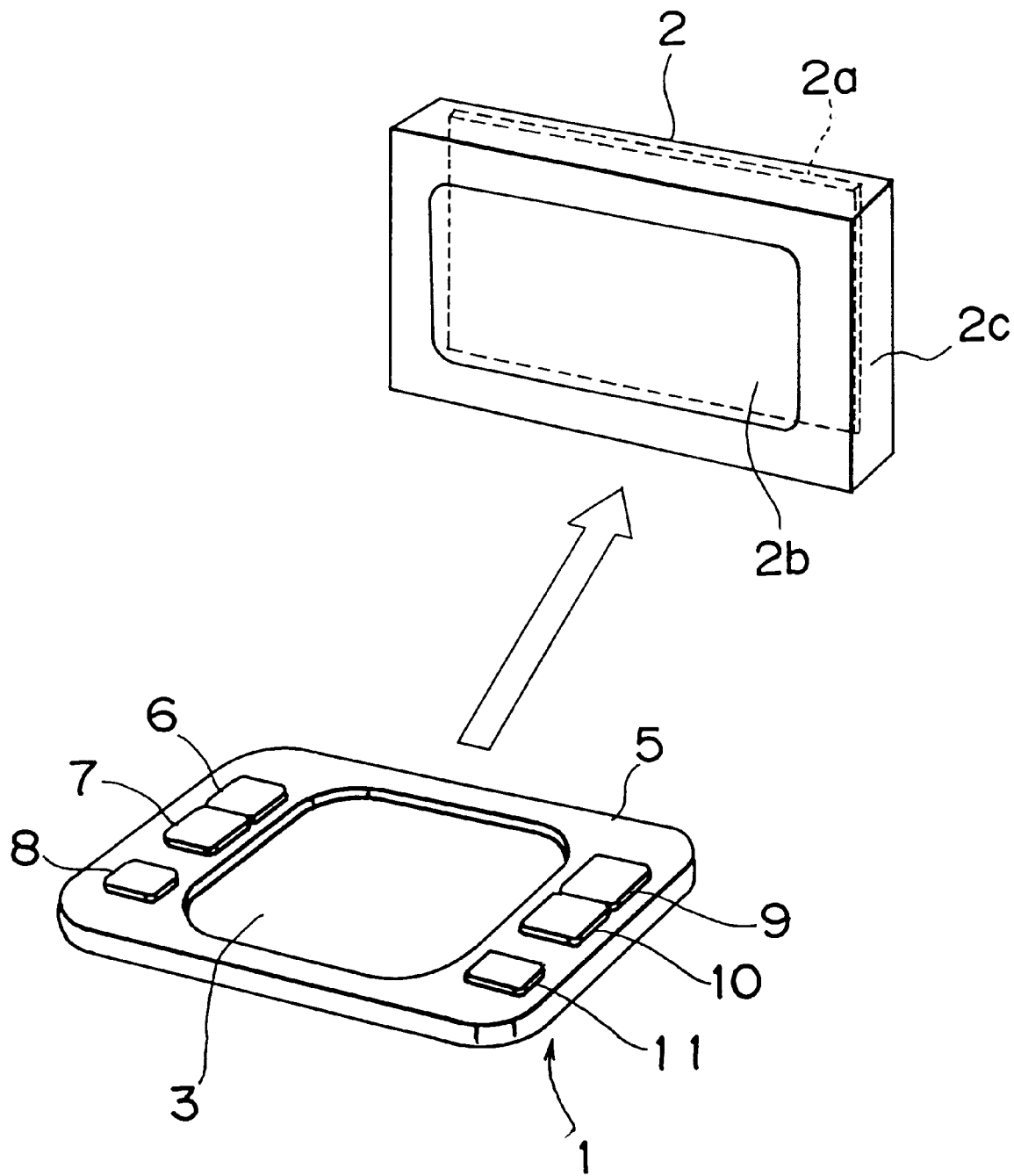
FIG. 1 is a perspective view showing a display device of the present invention.

FIG. 1 shows the entire structure of a display device system. In FIG. 1, a touch tracer 1 is disposed, for example, in an arm rest of a driver's side door so that it can be easily operated by the driver while driving the car. Touch operation information corresponding to the touch operation is outputted. Furthermore, for example, in a dash board of the car, a display device 2 is disposed. The display device 2 has a display means 2a, a display main body 2c which includes a microcomputer (not shown), and displays predetermined screens on a display screen 2b corresponding to the touch operation information from the touch tracer 1.

Figure 2:
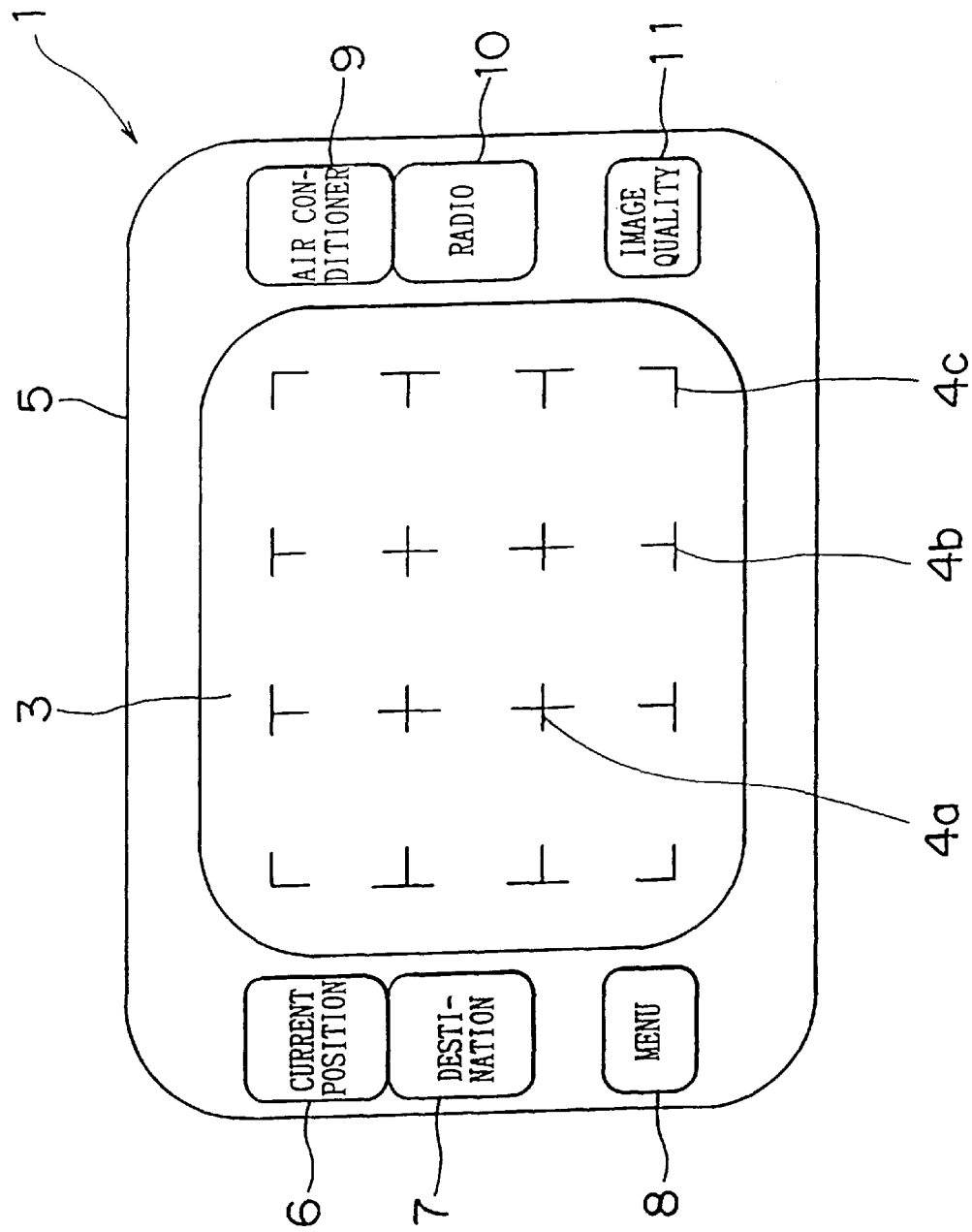
FIG. 2 is a front view of a touch tracer.

The touch tracer 1 is described in detail. FIG. 2 shows a front surface of the touch tracer 1. In FIG. 2, in a center of the touch tracer 1, an input pad 3 (50 mm ×70 mm) is disposed. At predetermined positions of a front surface of the input pad 3, line-shaped protruding parts 4a, 4b and 4c are formed. The protruding parts 4a, 4b and 4c are disposed in 16 places on the input pad 3, and four protruding parts 4a located in a central portion of the input pad 3 are formed in a "+" shape and the other protruding parts 4b and 4c are formed in a "T" shape or an "L" shape. Therefore, by merely touching the protruding parts 4a, 4b and 4c of the input pad 3, it is possible to confirm the touched position and it is possible to perform a blind operation. Furthermore, the positions of the protruding parts 4a and 4b correspond to the positions of the button display portions which are indicated on the display device 2, and the button display portion can be arbitrarily selected by a blind operation.

In a top surface of a main body 5, at positions about a periphery of the input pad 3, various mode selection buttons are disposed. A current position button 6, a destination button 7, a menu button 8, an air conditioner button 9, a radio button 10, and an image quality button 11 are provided as the mode selection buttons.

Figure 3:
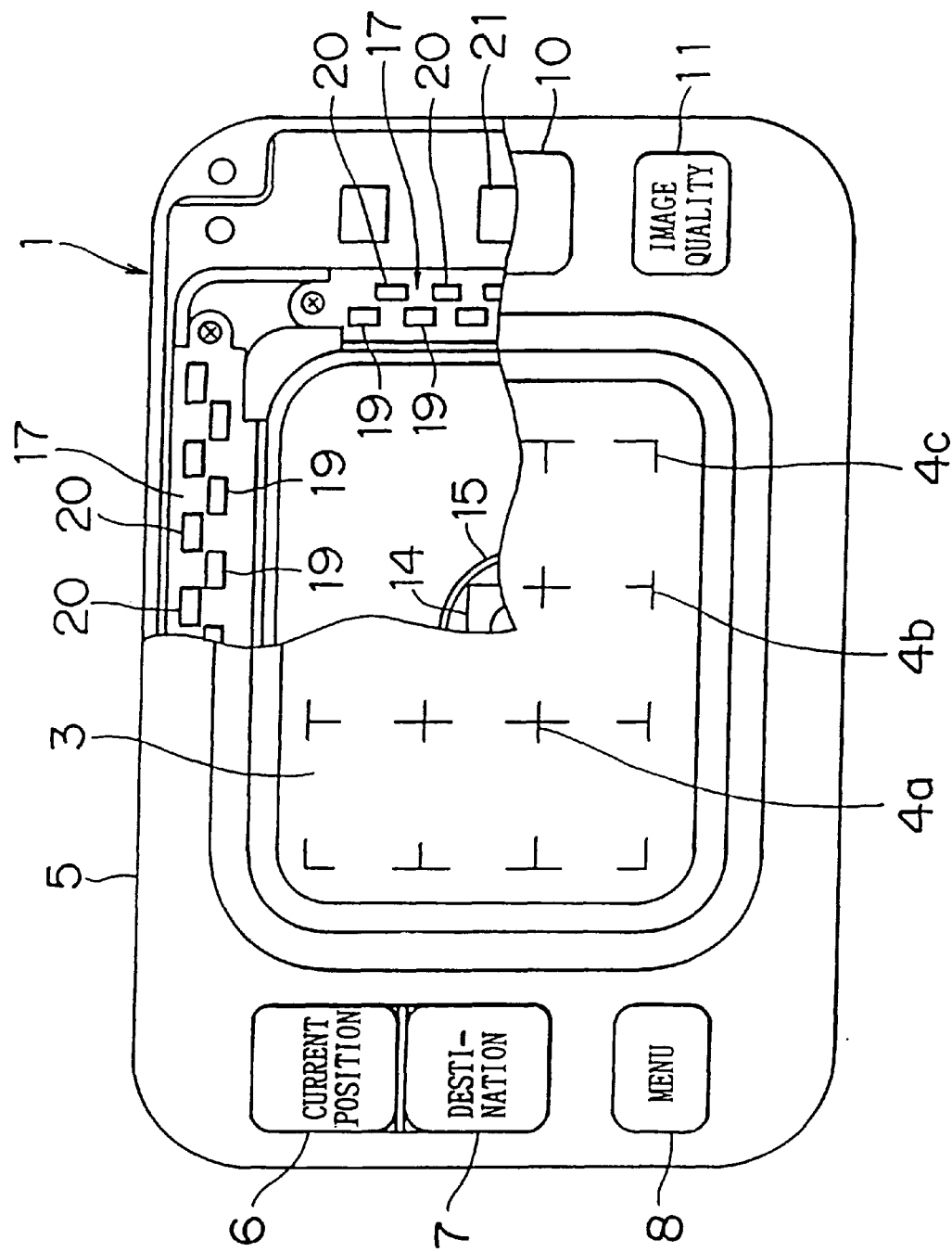
FIG. 3 is a front cut-away view of the touch tracer.
Figure 4:
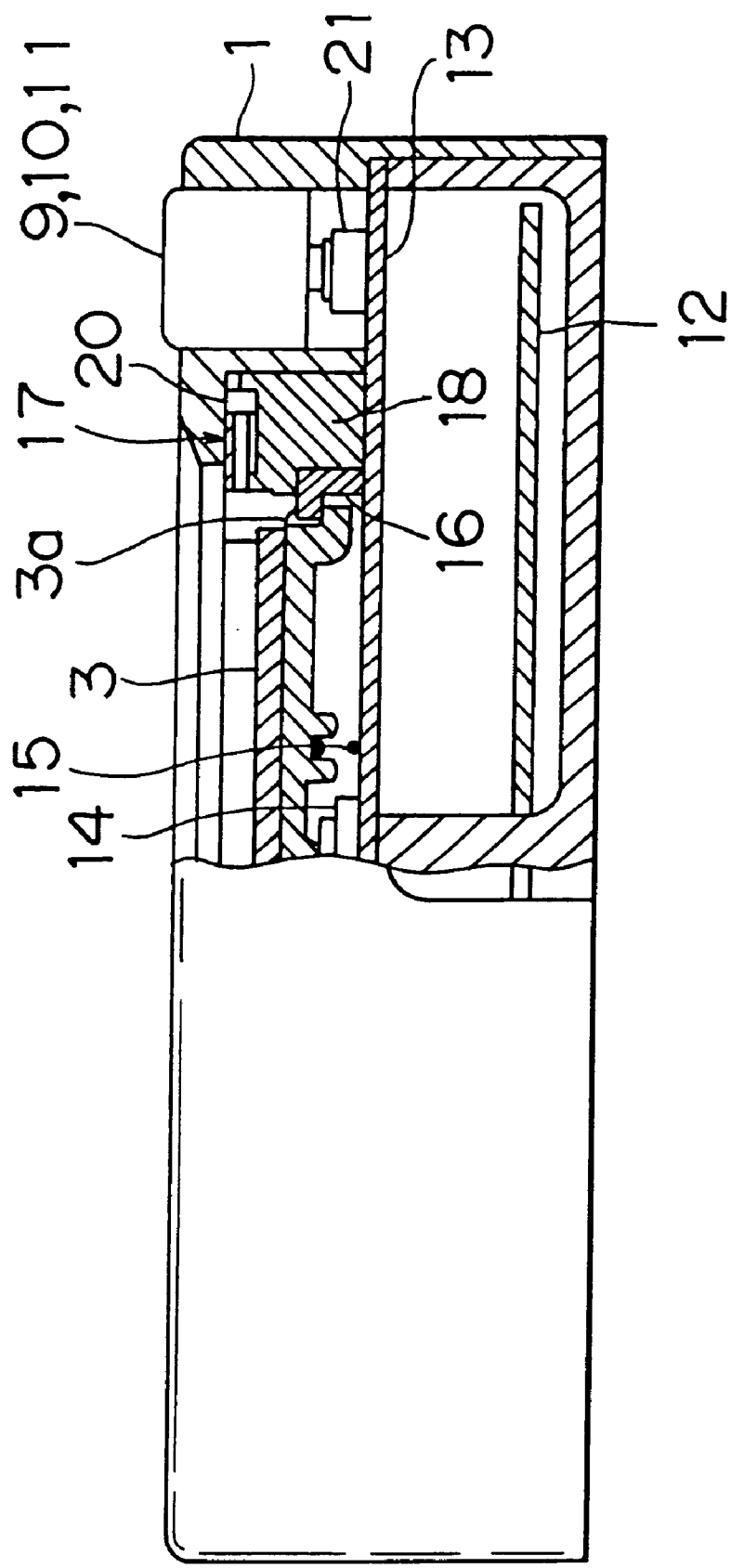
FIG. 4 is a cross-sectional view of the touch tracer.

FIG. 3 shows a front view of the touch tracer 1 partially cut away and FIG. 4 shows a cross-sectional view of the touch tracer 1. In FIGS. 3 and 4, a printed wiring substrate 12 is disposed at a bottom surface of the main body 5, and a printed wiring substrate 13 is disposed at a top. A touch switch 14 is mounted at a center of the printed wiring substrate 13 and a compression coil spring 15 is disposed so as to surround the touch switch 14. The input pad 3 is pushed from the lower direction by the compression coil spring 15. A frame-shaped engaging member 16 is set on the printed wiring substrate 13, and an outer periphery of the input pad 3 is engaged by a bottom surface of the engaging member 16. Furthermore, a pleat-shaped packing part 3a protrudes at the outer periphery of the input pad 3, and the packing part 3a contacts a top surface of the engaging member 16 so that the inside of the main body 5 is waterproofed.

An optical sensor unit 17 is mounted on the printed wiring substrate 13. The optical sensor unit 17 includes a plurality of LED's 19 and phototransistors 20 that are opposed and arranged on a sensor block 18 so as to form parallel optical axes, and the LED's 19 and phototransistors 20 are connected to the electrical circuit of the printed wiring substrate 13. Furthermore, a plurality of operation switches 21 are mounted on a peripheral portion of the printed wiring substrate 13 and the operation switches 21 can be turned on in response to the operation of the various operation buttons 6–11.

Figure 5:
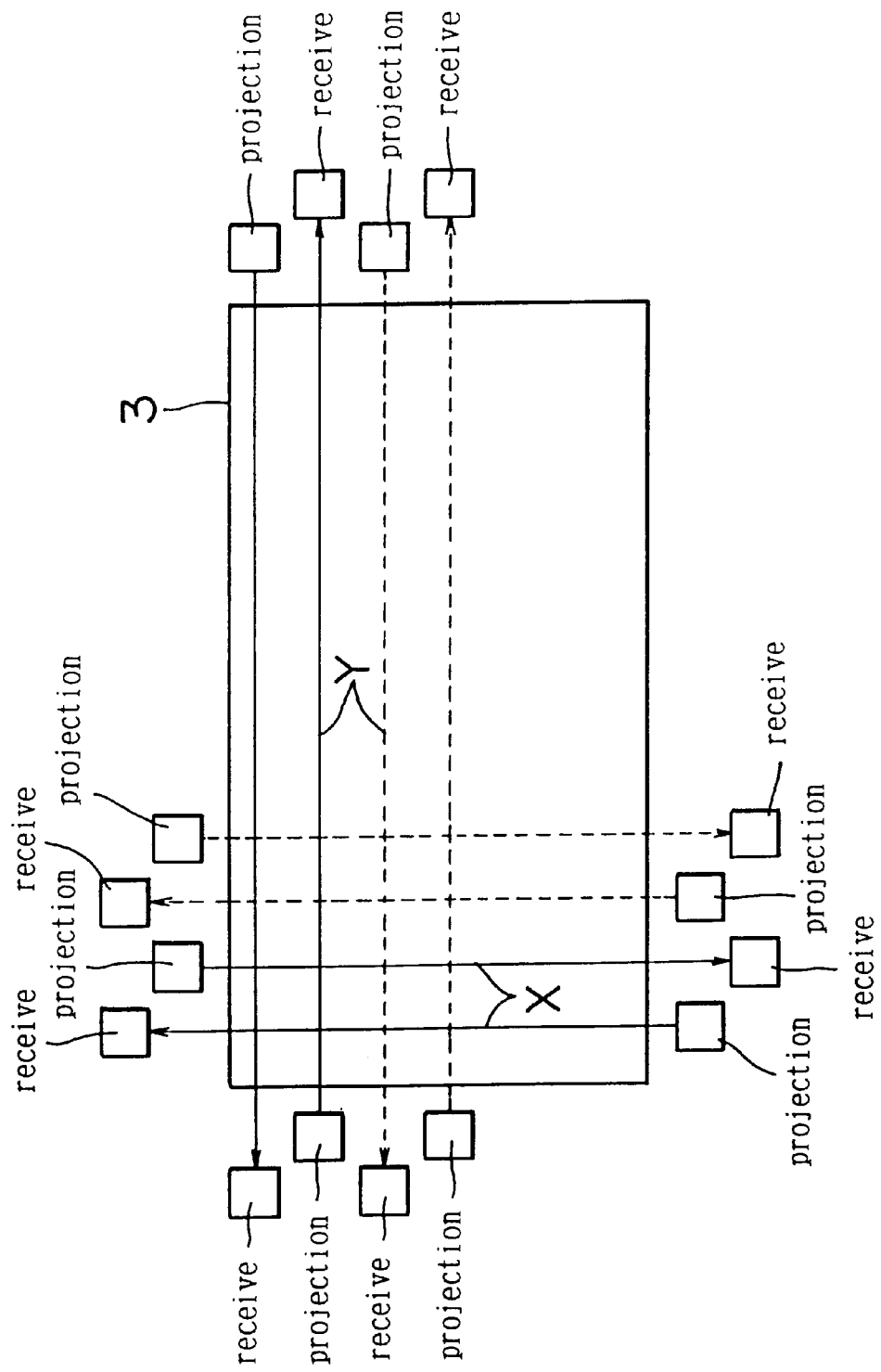
FIG. 5 is a diagrammatic view showing a relationship between LED's and phototransistors.

FIG. 5 shows the arrangement of the LED's 19 and phototransistors 20. In FIG. 5, 15 axes are provided as vertical direction optical axes (hereafter referred to as X lines), and 11 axes are provided as horizontal direction optical axes (hereafter referred to as Y lines). In this case, LED's 19 and phototransistors 20 are alternately arranged in parallel in each of the X lines and Y lines, respectively. Furthermore, in the parallel-arranged LED's 19 and phototransistors 20, the phototransistors 20 are disposed behind the LED's 19. By this arrangement, a decreased optical axis pitch of 3 mm for the X lines and a decreased optical axis pitch of 4 mm for the Y lines are achieved.

Figure 6:
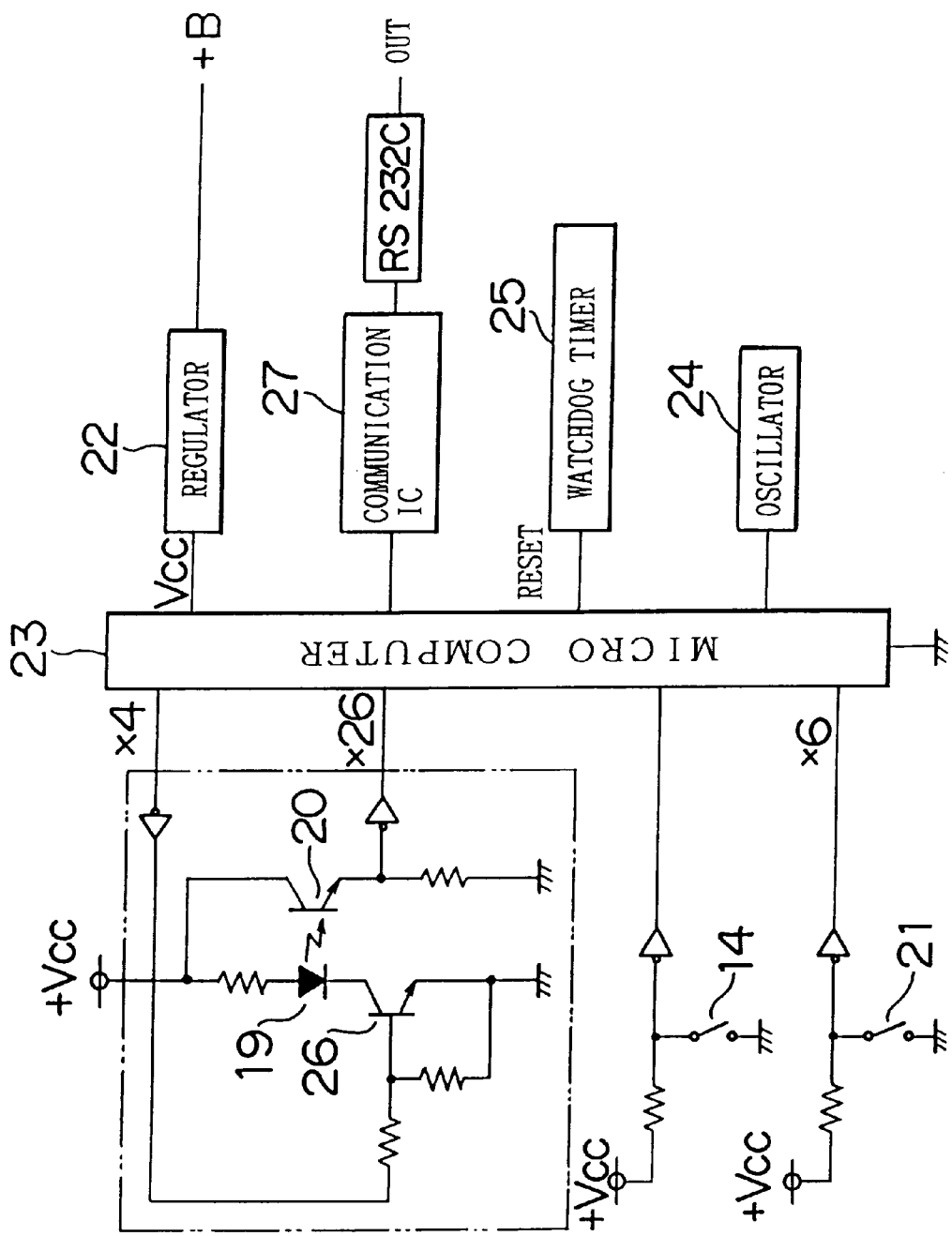
FIG. 6 is a schematic view showing an electrical structure of the touch tracer.

FIG. 6 shows an electrical structure of the touch tracer 1. In FIG. 6, voltage of a battery is provided to a microcomputer 23 in a state where a predetermined constant voltage is stabilized by a regulator 22, and the microcomputer 23 operates in response to a pulse signal from an oscillator 24. Furthermore, a watchdog timer 25 is connected to a reset terminal of the microcomputer 23. When the microcomputer 23 malfunctions, it is forcefully reset by the watchdog timer 25. Moreover, the microcomputer 23 is connected so as to receive the input of the "on" and "off" signals from the touch switch 14 and the various operation switches 21.

Each LED 19 is connected to a transistor 26, and in a state where the transistor 26 is turned on through current from the microcomputer 23, the LED 19 emits light. Furthermore, the microcomputer 23 is connected so as to receive the input of the output voltage from each phototransistor 20. The microcomputer 23 outputs the "on" data of the switches 14 and 21 and the coordinate data showing the touched position of the finger on the input pad 3 to a later-level circuit, i.e., a circuit that comes later in sequence, through a communication IC 27 based upon the "on" and "off" states of each switch 14 and 21 and phototransistors 20. In this case, the microcomputer 23 is designed to output data at the speed of 9600 bps at intervals of 50 ms.

Next, a display operation by the display device 2 at a time of a touch operation of the input pad 3 is explained.

Figure 7:
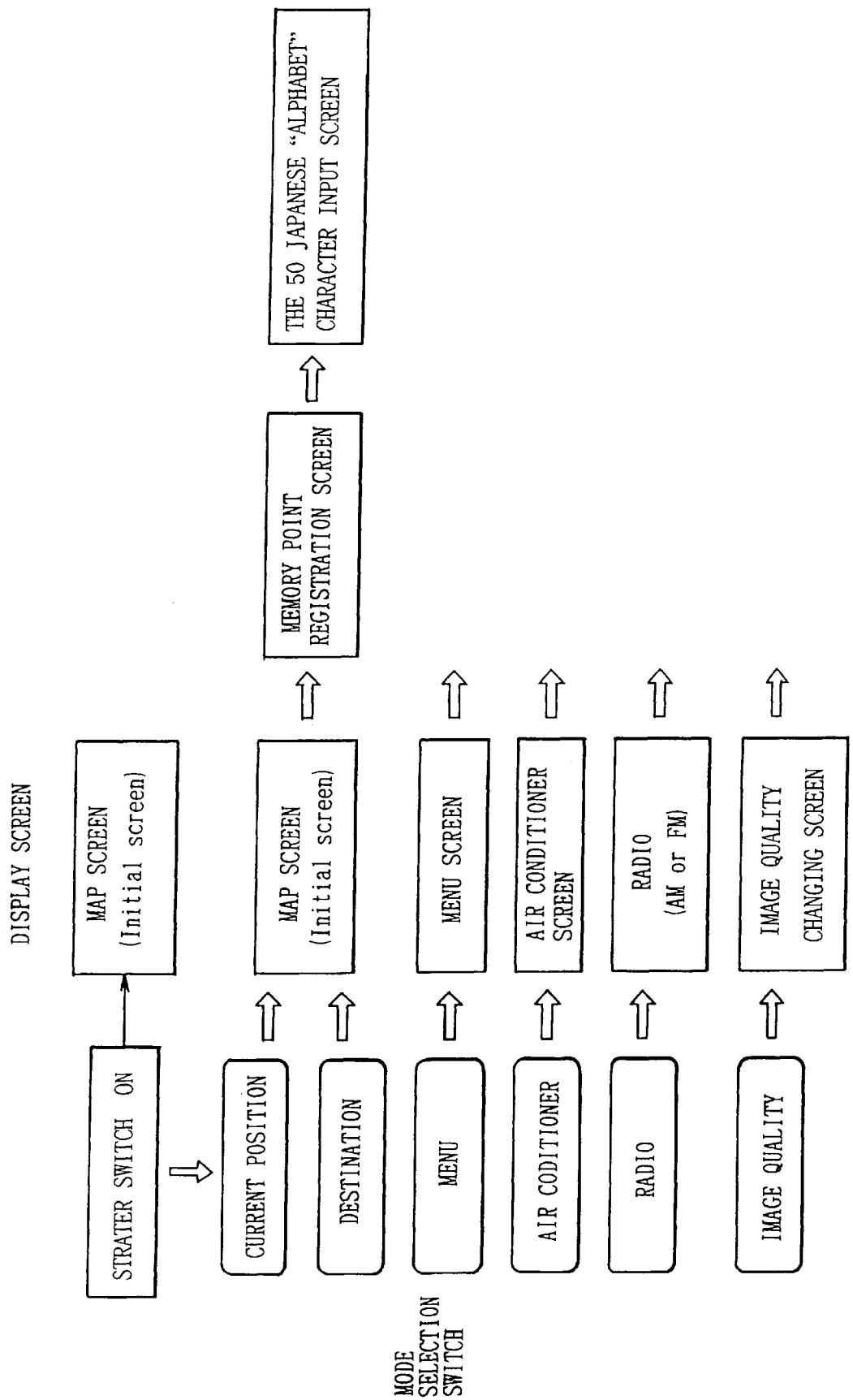
FIG. 7 is a diagram showing the display procedure of the display screen corresponding to the operation of the touch tracer.
Figure 8:
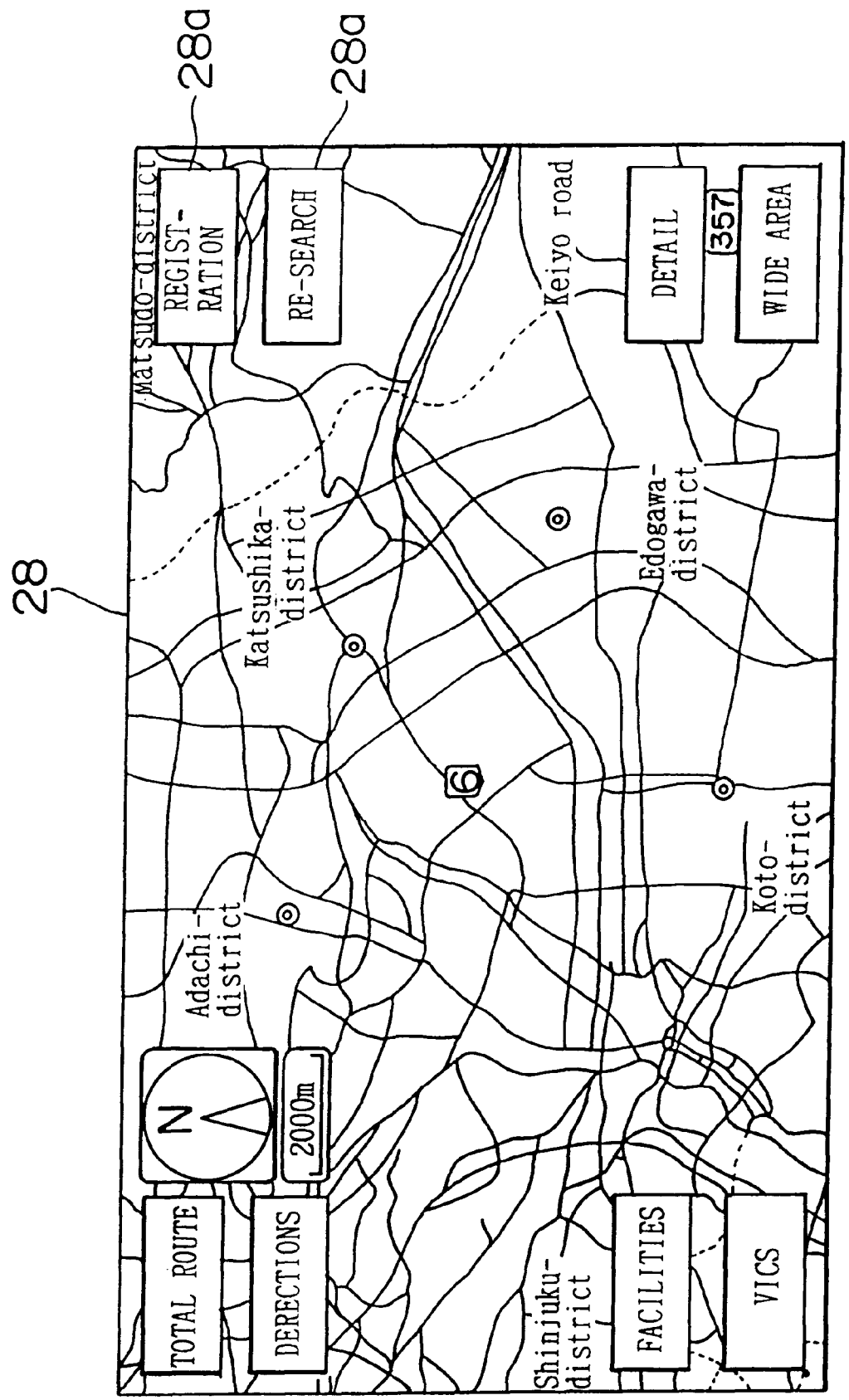
FIG. 8 is a map showing the map screen which is displayed in the display device.

FIG. 7 schematically shows the display operation of the display device 2. In FIG. 7, by turning a starter switch on, i.e., the power is turned on, the navigation function operates as an initial function. The display device 2 displays a map screen 28 showing a current geographical position as shown in FIG. 8 as one example of an initial screen. At this time, button display portions 28a for the navigation function selection are displayed at 8 points on edge portions of the map screen 28. The button display portions 28a correspond to the positions of the protruding parts 4a, 4b and 4c, among the protruding parts 4 of the input pad 3, which are located at respective points on both sides of the input pad 3. A blind operation of the button display portions 28a is made possible by the protruding parts 4a, 4b and 4c.

Figure 9:
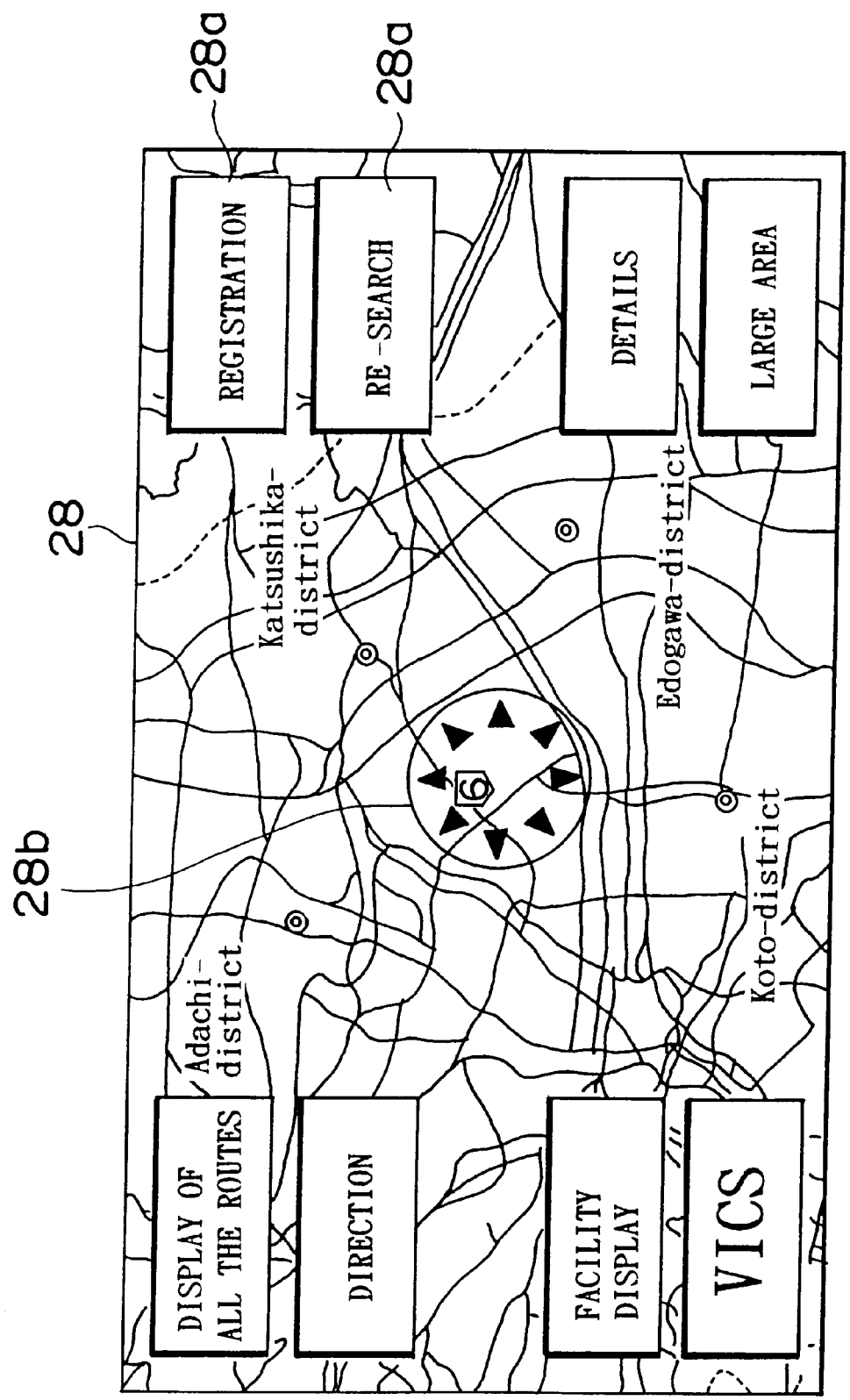
FIG. 9 is a map which is equivalent to FIG. 8 showing a state where the button display portions are displayed in an expanded state.

When the driver touches the input pad 3 of the touch tracer 1, the touch operation information showing that the touch operation was performed by the touch tracer 1 is output so that the display device 2 displays in an expanded state button display portions 28a which are displayed on the map screen 28 as shown in FIG. 9. Therefore, the driver can easily confirm the display content of the button display portion 28a and easily select a desired button display portion 28a by a blind operation of the touch tracer 1. When the driver operates a desired navigation function by the touch operation of the input pad 3 of the touch tracer 1 at a position corresponding to the button display portion 28a, which is displayed on the map screen 28, or touches the input pad 3 by a finger in order to scroll the map, the microcomputer 23 determines that the finger touches the input pad 3 and outputs the coordinate data of the touched position. By so doing, the display device 2 displays the touched position of the input pad 3 and the driver can confirm the current touched position.

Furthermore, when the driver touches the input pad 3 of the touch tracer 1 corresponding to the button display portion 28a which is displayed on the map screen 28, the coordinate data which shows the position of the button display portion is output from the touch tracer 1 so that the display device 2 displays the button display portion 28a corresponding to the touched position by changing colors. By so doing, the driver can confirm the button display portion 28a which was selected and operated so that the driver press-operates the input pad 3 as desired.

Then, the microcomputer 23 outputs the "on" data showing that the touch switch 14 is turned on, and the display device 2 displays the button display portion 28a corresponding to the touched position in a state where it appears sunken or otherwise "indented", changes color, and/or actuates a buzzer for a short period of time. By so doing, the driver can confirm that the desired button display portion 28a was selected based upon the display condition which is displayed on the display device 2.

Figure 10:
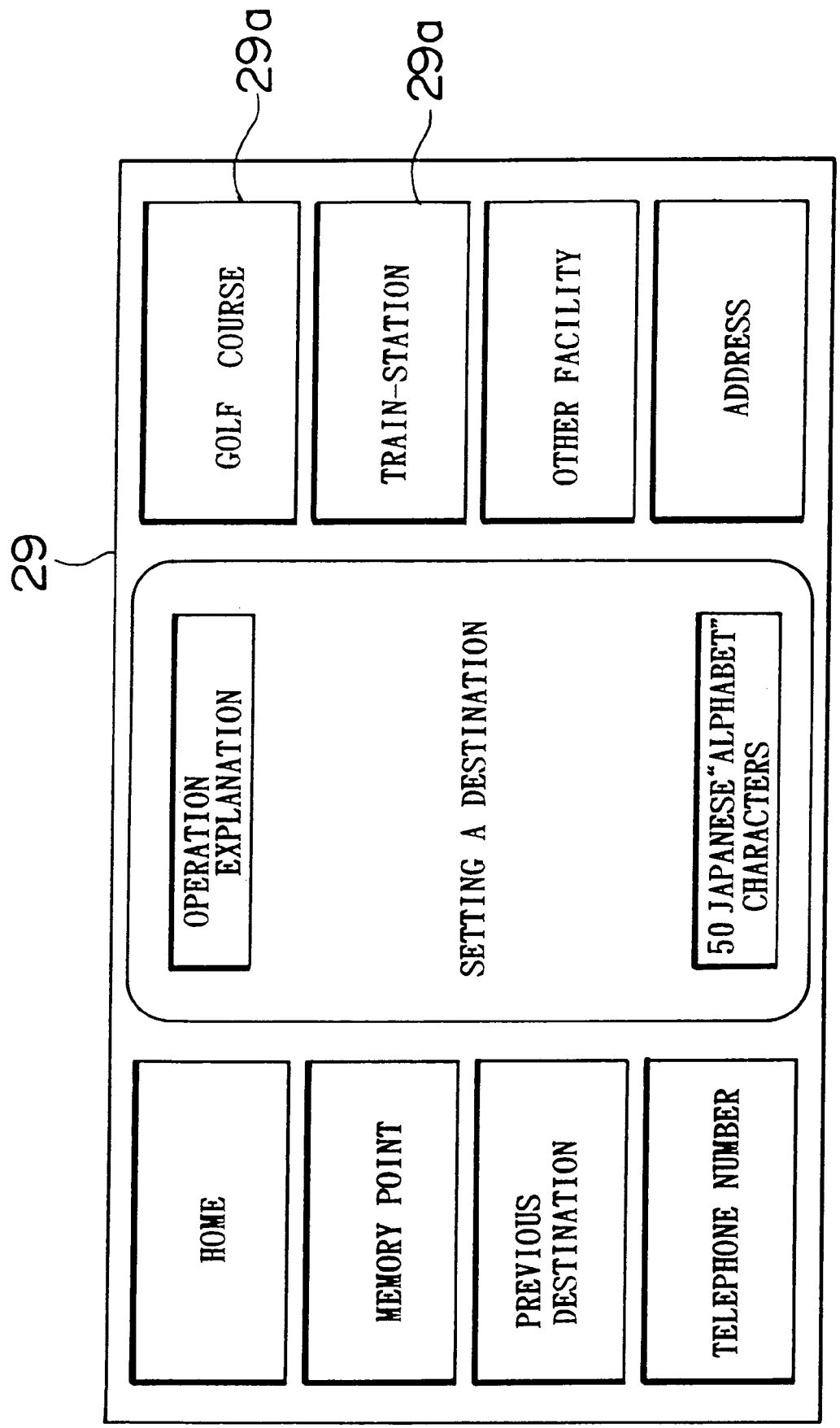
FIG. 10 is a graphical user interface which is equivalent to FIG. 8 showing a destination setting screen.

Furthermore, the display device 2 is switched from a map screen display mode to a selection mode as shown in FIG. 7 when any of the mode selection buttons 6–11 disposed on the periphery of the input pad 3 is press-operated and a screen corresponding to the selection mode is displayed. In this case, regardless of the mode screen, by press-operating any mode selection switch, a corresponding mode screen is directly displayed. The display device 2 displays a destination setting screen 29 as shown in FIG. 10 when the destination button 7 is press-operated. In this case, by touch-operating the input pad 3 of the touch tracer 1 corresponding to a button display portion 29a which is displayed on a destination setting screen 29, setting a destination or various destinations can be selected.

Figure 11:
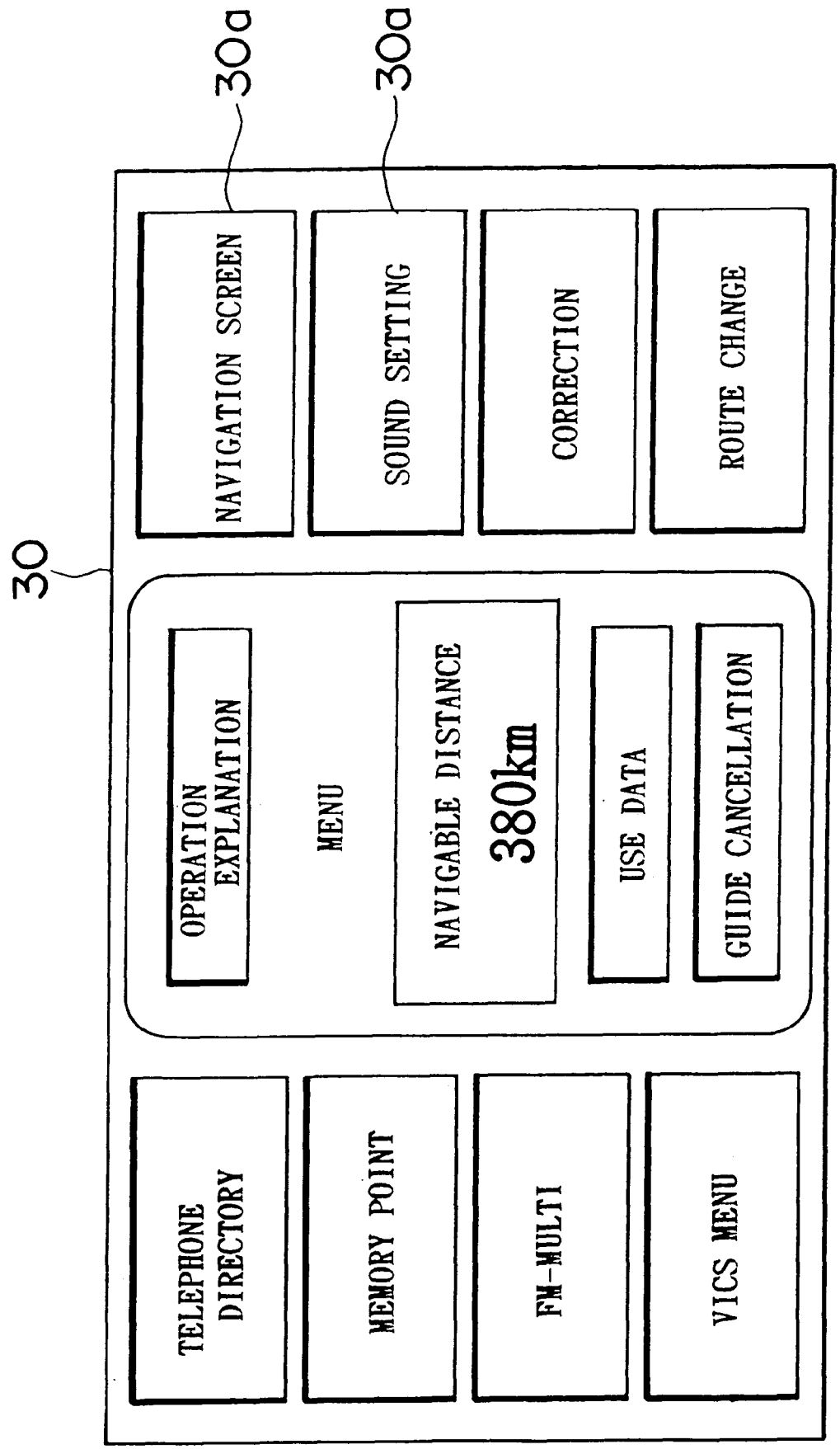
FIG. 11 is a graphical user interface which is equivalent to FIG. 8 showing a menu screen.
Figure 12:
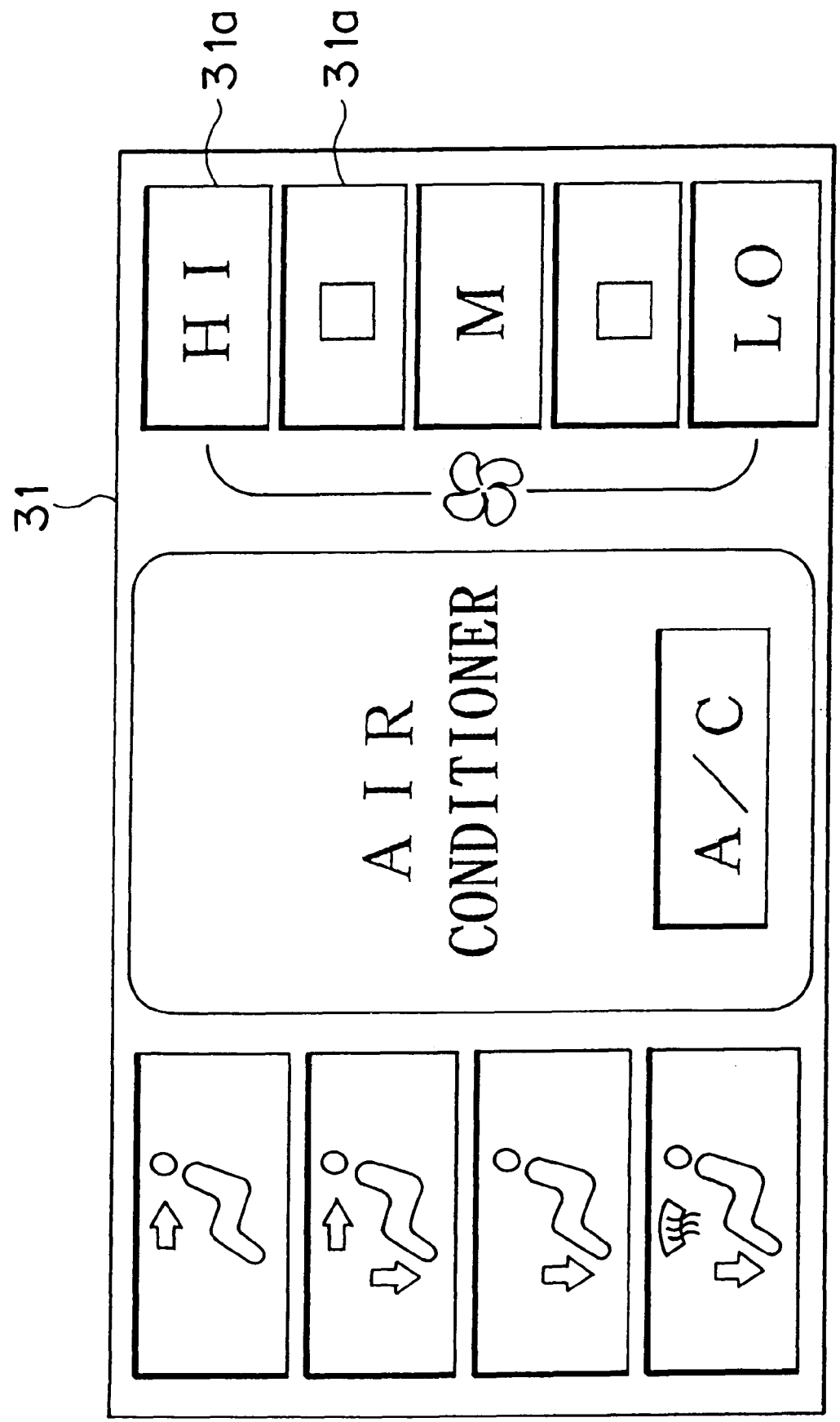
FIG. 12 is a graphical user interface which is equivalent to FIG. 8 showing an air conditioner screen.
Figure 13:
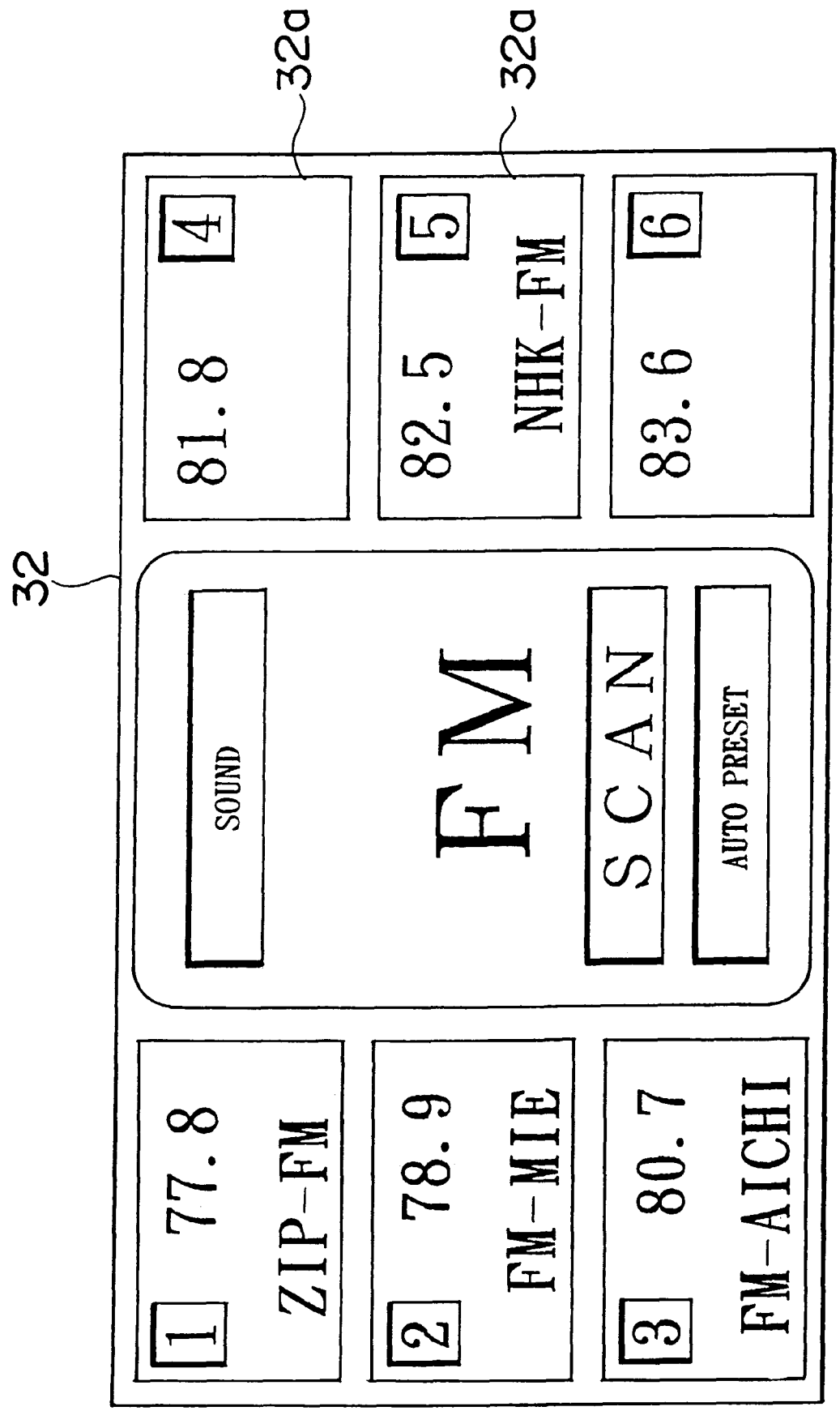
FIG. 13 is a graphical user interface which is equivalent to FIG. 8 showing a radio screen.

Furthermore, the display device 2 displays a menu screen 30 as shown in FIG. 11 when the menu button 8 is press-operated. An air conditioner screen 31 as shown in FIG. 12 is displayed when the air conditioner button 9 is press-operated, and a radio screen 32 as shown in FIG. 13 is displayed when the radio button 10 is press-operated. Also, in these display screens, corresponding button display portions 30a, 31a, and 32a, are displayed, respectively, and when the "on" data is input showing that the input pad 3 is press-operated in a state where the coordinate data from the input pad 3 of the touch tracer 1 corresponds to the selected button display portion, the display device 2 performs the display operation corresponding to the selected button display portion.

Figure 14:
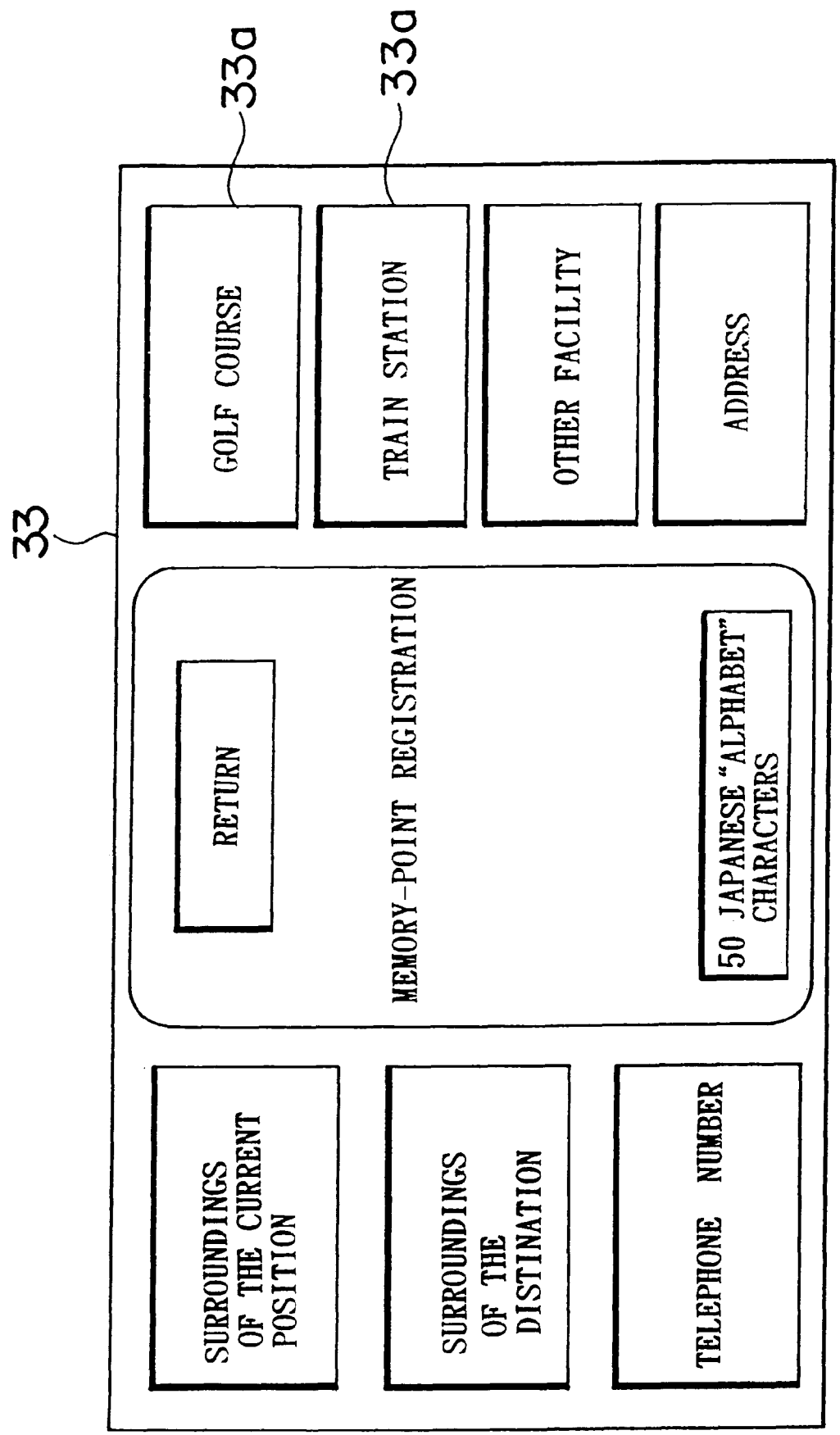
FIG. 14 is a graphical user interface which is equivalent to FIG. 8 showing a memory point registration screen.

Specifically, in the display device 2, in a state where the destination setting screen 29 is displayed as shown in FIG. 10, when "memory point" is selected by the touch operation of a part of the input pad 3 of the touch tracer 1 corresponding to the "memory point" display portion 29a, a memory point registration screen 33 is displayed as shown in FIG. 14. In this case, by touch-operating the part of the input pad 3 of the touch tracer 1 corresponding to a button display portion 33a which is displayed on the memory point registration screen 33, registration of the memory point can be selected.

As described above, the driver can select a desired button display portion which is displayed on the display device 2 by a blind input of the touch tracer 1. But, if the driver performs an erroneous operation of the touch tracer 1 or the like, the button display portion cannot be reliably selected. Therefore, the display device 2 handles an erroneous operation in a following manner. When the driver suddenly press-operates the input pad 3 of the touch tracer 1, or when an object falls onto the input pad 3, and thus the input pad 3 is touch-operated and simultaneously press-operated, "on" data showing that the input pad 3 was press-operated simultaneously with the output start is output from the touch tracer 1. Therefore, in these cases, the display device 2 determines an erroneous operation and invalidates the input coordinate data and "on" data. By so doing, the erroneous display by the simultaneous pressing of the input pad 3 can be prevented.

Furthermore, when the touch operation position moves due to an accidental touch or the like, while the driver is press-operating the input pad 3 of the touch tracer 1, the coordinate data, which was input at the output state of the "on" data showing that the input pad 3 was press-operated by the touch tracer 1, changes. Therefore, in this case, the display device 2 determines that it was an erroneous operation and invalidates the input coordinate data and "on" data. By so doing, an erroneous display by an abnormal operation of the input pad 3 can be prevented.

As the driver touch-operates the part of the input pad 3 of the touch tracer 1 corresponding to the button display portion, the desired button display portion is confirmed to be touch-operated in the display device 2. Then, when the input pad 3 is press-operated in order to select that button display portion, in the case that the touch operation position has moved to a part of the input pad 3 corresponding to another button display portion, for example, by an accidental touch, the button display portion, corresponding to the coordinate data which was input during an output state of the "on" data from the touch tracer 1 showing that the input pad 3 is press-operated, changes. In cases like this, the display device 2 determines that it was an erroneous operation and selects the button display portion that was indicated prior to the erroneous movement. By so doing, the erroneous selection of the button display portion by the abnormal operation of the input pad 3 can be prevented.

Figure 15:
FIG. 15 is a graphical user interface which is equivalent to FIG. 8 showing the 50 Japanese "alphabet" characters input screen.

When the 50 Japanese "alphabet" character input is selected by a touch operation of the part of the input pad 3 corresponding to the "50 Japanese 'alphabet' characters" display portion 29a in a state where the destination setting screen is displayed on the display device 2 as shown in FIG. 10 or the memory point registration screen is displayed as shown in FIG. 14, the display device 2 displays a keyboard screen 34 as shown in FIG. 15. In this case, it is difficult to perform an operation which selects a desired key among many keys on the keyboard screen 34, so the display device 2 performs the key selection as follows. In order to select and operate a desired key on the keyboard screen 34, when the desired key is selected in accordance with the press-operation direction, i.e., upper, lower, right or left, of the input pad 3, the press-operation of the input pad 3 is released. Therefore, the display device 2 selects the key which was select-displayed at the time the "on" data from the touch tracer 1 is interrupted, i.e. when the press-operation of the input and 3 is released. By so doing, even when a predetermined key, is selected among the many displayed keys such as on the keyboard screen 34, it is possible to appropriately select a desired key.

Figure 16:
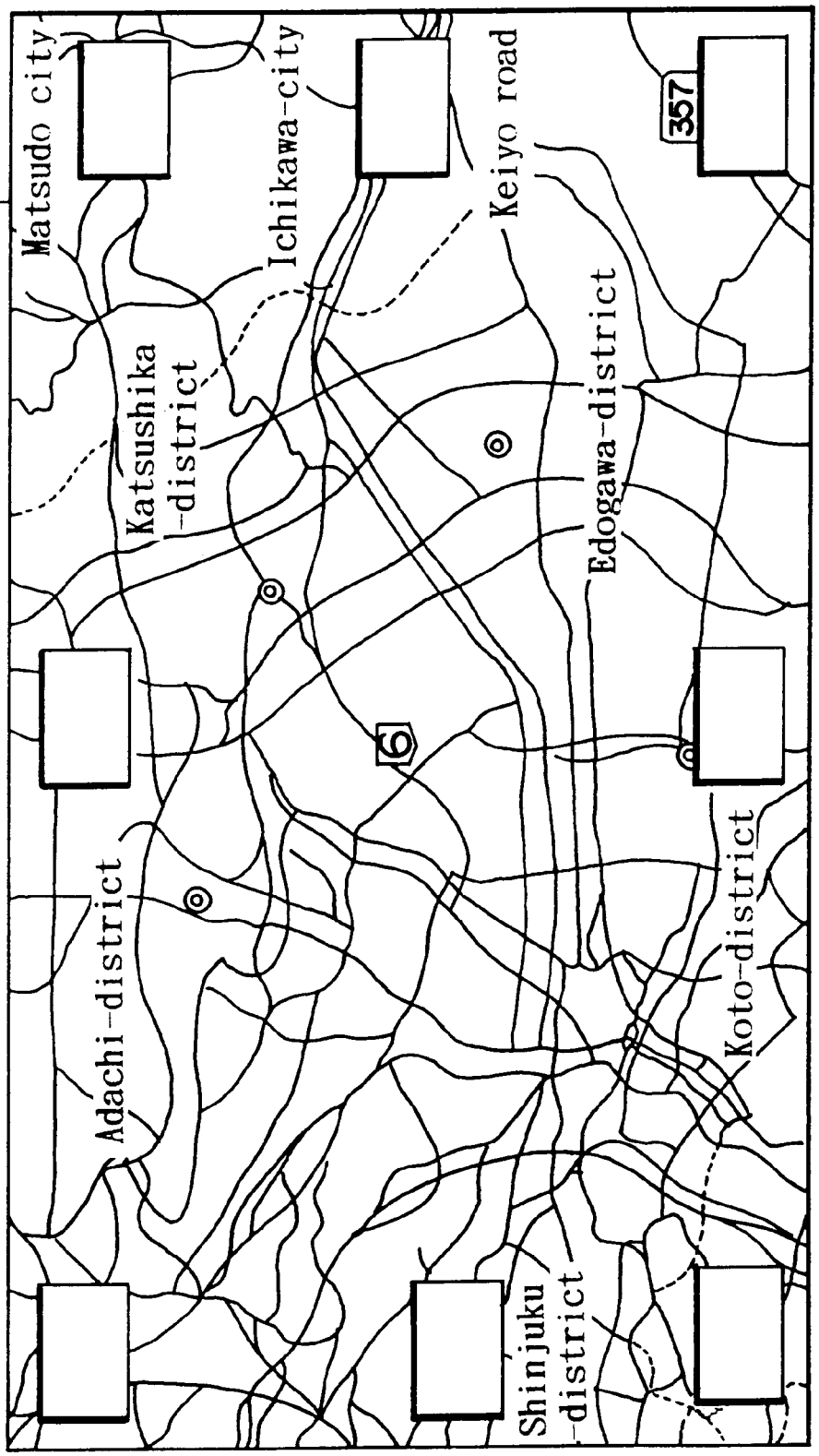
FIG. 16 is a map showing a scroll screen which is equivalent to FIG. 8.

Furthermore, when the part of the input pad 3 of the touch tracer 1 corresponding to the scroll operation portion 28b which is shown by a circle displayed in the center of the map screen shown in FIG. 9 is touched, the display device 2 moves to a scroll mode and displays a scroll screen 35 shown in FIG. 16. The screen scrolls based upon the input coordinate data. When the coordinate data is no longer input, a timer is operated from when the coordinate data ceases to be input. When the clock time by the timer exceeds a set time, it returns from the scroll mode. Accordingly, the driver can arbitrarily return from the scroll mode without performing a returning operation from the scroll mode.

Furthermore, when the display device 2 determines that the touch operation of the input pad 3 continues for a predetermined time or more based upon the coordinate data which is input from the touch tracer 1, an explanation of the function of the button display portion on an upper portion of the screen is displayed. Also, for the user's convenience, an explanation of the button display portion can be made by voice.

According to the invention, when the display device 2 determines that the input pad 3 is touch-operated based upon the input of the coordinate data from the touch tracer 1, the button display portion 28a which is displayed on the map screen 28 is displayed in an expanded state so that the driver can easily confirm the display content of the button display portion 28a. In this case, the display device 2 changes the display configuration of the button display portion 28a when the button display portion 28a is selected by the touch operation of the input pad 3 of the touch tracer 1 so that the driver can easily confirm that the desired button display portion 28a was selected.

Moreover, when the display device 2 determines that it was an erroneous operation based upon the coordinate data which was input from the touch tracer 1 and the "on" data showing that the input pad 3 was press-operated, the input coordinate data and "on" data are invalidated so that it is possible to prevent the execution of an erroneous display operation even when the erroneous operation of the touch tracer 1 is performed.

The present invention is not limited to the above embodiment and can be modified or expanded as follows. It is also acceptable to form the touch tracer 1 so as to be integrated with the display device 2. It is also acceptable to transmit the signal from the touch tracer 1 to the display device 2 by infrared radiation.

As clarified from the above explanation, according to the display device of the present invention, in the structure where the display screen is switched in response to the selected button display portion, the button display portion shown on the display screen is displayed in an expanded state with the coordinate data showing the touched position on the operating surface. Thus, the present invention has excellent effects such that it is possible to improve the select-operation of the button display portion by the user and prevent the button display portion from erroneous selection regardless of erroneous operation by the user, and it is possible to appropriately perform the switch operation of the display screen according to the button display portion.

While the present invention has been described with reference to what are presently considered to be preferred embodiments thereof, it is to be understood that the invention is not limited to the disclosed embodiments or constructions. To the contrary, the invention is intended to cover various modifications and equivalent arrangements.

What is claimed is:

1. Display apparatus comprising:
    means for receiving coordinate data indicative of a touch position located at a particular position on a touch input device, wherein touch operation of the input device corresponds to display of a button on the display apparatus;
    means for displaying an "on" condition representing press operation of the operating surface;
    means to perform a display operation corresponding to a button display portion on the display apparatus when "on" condition data is input to the in a state in which the input coordinate data corresponds to a button display portion of the display; and means for invalidating input coordinate data and "on" data when the "on" data is input simultaneously with commencement of the input of the coordinate data.

2. Display apparatus comprising:

means for receiving coordinate data indicative of a touch position located at a particular position on a touch input device, wherein touch operation of the input device corresponds to display of a button on the display apparatus;

means for displaying an "on" condition representing press operation of the operating surface;

means to perform a display operation corresponding to a button display portion on the display apparatus when "on" condition data is input to the in a state in which the input coordinate data corresponds to a button display portion of the display; and means for invalidating input coordinate data and "on" data when the button display portion corresponding to the input coordinate data changes in an input state of the "on" data.

3. Display apparatus comprising:

means for receiving coordinate data indicative of a touch position located at a particular position on a touch input device, wherein touch operation of the input device corresponds to display of a button on the display apparatus;

means for displaying an "on" condition representing press operation of the operating surface;

means to perform a display operation corresponding to a button display portion on the display apparatus when "on" condition data is input to the display apparatus in a state in which the input coordinate data corresponds to a button display portion of the display; and means for validating the button display portion indicated prior to change when the button display portion corresponding to the coordinate data in the input timing of the "on" data changes.

4. A display apparatus, comprising:

a display panel member having a plurality of button display portions displayed on the display panel member at predetermined locations, each one of the plurality of button display portions representative of a different one of a plurality of functions;

an input pad device connected to and remote from the panel member and operative to input data, including "on" data, to the display panel member by touching a part of the input pad device corresponding to the predetermined location of a selected button display portion representative of a desired function; and invalidation means for invalidating a selected function upon determination that the touching a part of the input pad device was an erroneous operation.

5. A display apparatus as set forth in claim 4, wherein the display panel member includes one of a map screen display mode and a button selection mode.

6. A display apparatus as set forth in claim 5, wherein the display panel member is operative in the map screen display mode until changed to the button selection mode.

7. A display apparatus as set forth in claim 4, wherein the input pad device includes a plurality of mode selection buttons.

8. A display apparatus as set forth in claim 7, wherein the display panel member is operative in a map screen display mode until one of the plurality of mode selection buttons is activated causing the display panel member to operate in a button selection mode.

9. A display apparatus as set forth in claim 7, wherein the plurality of mode selection buttons includes at least two of a current position button, a destination button, a menu button, an air conditioner button, a radio button and an image quality button.

10. A display apparatus as set forth in claim 4, further comprising confirmation means for confirming the touched part of the input pad device corresponds to the selected button display portion representative of the desired function.

11. A display apparatus as set forth in claim 10, wherein the confirmation means confirms the touched part of the input pad device by at least one of changing an appearance of the desired button display portion and actuating an alarm.

12. A display apparatus as set forth in claim 11, wherein changing the appearance of the desired button display portion includes at least one of changing color of the desired button display portion and changing configuration of the desired button display portion.

13. A display apparatus as set forth in claim 4, wherein the invalidation means invalidates input coordinate data and "on" data when the "on" data is input simultaneously with commencement of input of the coordinate data.

14. A display apparatus as set forth in claim 4, wherein the invalidation means invalidates input coordinate data and "on" data when the button display portion corresponding to input coordinate data changes in an input state of the "on" data.

15. A display method comprising:

displaying on a display panel member a plurality of button display portions at predetermined locations, each one of the plurality of button display portions representative of a different one of a plurality of functions;

inputting data to the display panel member via an input pad device, connected to and remote from the panel member, by touching a part of the input pad device corresponding to a predetermined location of a selected button display representative of a desired function, and invalidating a selected function upon determination that the touching a part of the input pad device was erroneously entered.

16. A display method comprising:

inputting into a display means coordinate data showing a touch position on an operating surface which is disposed at a specific position, and "one" data showing that the operating surface has been press operated, performing a display operation corresponding to a button display portion which is displayed on the display means when "on" data is input into a state in which the coordinate data corresponds to the button display portion, and invalidating input coordinate data and "on" data when the "on" data is input simultaneously with commencement of the input of the coordinate data.

17. A display method as set forth in claim 16, further comprising the step of displaying the button display portion in an enlarged state which is displayed on the display means in an input state of the coordinate data.

18. A display method as set forth in claim 16, further comprising the step of enlarging the button display portion with respect to its size on the operating surface.

* * * * *